United States Patent
Yuzawa

(10) Patent No.: US 7,024,684 B2
(45) Date of Patent: Apr. 4, 2006

(54) DIGITAL SIGNAL RECEIVER AND DIGITAL SIGNAL DISPLAY METHOD

(75) Inventor: Keiji Yuzawa, Saitama (JP)

(73) Assignee: Sony Corporation, (JP)

( * ) Notice: Subject to any disclaimer, the term of this patent is extended or adjusted under 35 U.S.C. 154(b) by 1000 days.

(21) Appl. No.: 09/805,600

(22) Filed: Mar. 13, 2001

(65) Prior Publication Data

US 2002/0012406 A1    Jan. 31, 2002

(30) Foreign Application Priority Data

Mar. 15, 2000  (JP)  ............................ P2000-073172

(51) Int. Cl.
*H04N 7/173* (2006.01)

(52) U.S. Cl. ...................... 725/139; 725/131; 725/134; 725/142

(58) Field of Classification Search ............... 725/2, 725/31, 139, 151, 131, 134, 142; 375/219, 375/316, 240.01, 240.26; 711/100, 154
See application file for complete search history.

(56) References Cited

U.S. PATENT DOCUMENTS 5,886,731 A * 3/1999 Ebisawa .................. 725/32
5,990,927 A   11/1999 Hendricks et al.
6,229,895 B1 * 5/2001 Son et al. .................. 380/200

FOREIGN PATENT DOCUMENTS

| EP | 0 827 336 A2 | 3/1998 |
| WO | WO-99/62248 | 12/1999 |
| WO | WO-00/07361 | 2/2000 |

OTHER PUBLICATIONS

Hyoung Joong Kim et al., "A Model of GUI for Interactive TV", Tencon 99. Proceedings of the IEEE Region 10 Conference, Sep. 15, 1999, pp. 1514-1517.

Milan Milenkovic, "Delivering Interactive Services to Home Using Digital Video Broadcast Infrastructure", Community Networking Proceedings 1997, Fourth International Workshop, Sep. 11, 1997, pp. 133-142.

* cited by examiner

*Primary Examiner*—Chris Kelley
*Assistant Examiner*—Johnny Ma
(74) *Attorney, Agent, or Firm*—Lerner, David, Littenberg, Krumholz & Mentlik, LLP

(57) ABSTRACT

In a digital receiver which can easily store broadcast information, a one-period amount of data is separated from a data broadcast signal. The one-period amount of data has an amount of data corresponding to plural frames which are periodically repetitively transmitted in the data broadcast signal. The one-period amount of data is stored in a data storage device, thereby simplifying the construction of the data storage device.

12 Claims, 3 Drawing Sheets

LIST TABLE

| INFORMATION ITEM NAME 1 | WATCH |
| INFORMATION ITEM NAME 2 | WATCH |
| INFORMATION ITEM NAME 3 | WATCH |
| INFORMATION ITEM NAME 4 | WATCH |

LIST TABLE

| INFORMATION ITEM NAME 1 | WATCH | DELETE |
| INFORMATION ITEM NAME 2 | WATCH | DELETE |
| INFORMATION ITEM NAME 3 | WATCH | DELETE |
| INFORMATION ITEM NAME 4 | WATCH | DELETE |

FIG. 5A

BASEBALL GAME BROADCAST
(MOVING PICTURE)

FIG. 5B

BASEBALL GAME BROADCAST | PAST RECORD OF ○○ PLAYER

DIGITAL SIGNAL RECEIVER AND DIGITAL SIGNAL DISPLAY METHOD

BACKGROUND OF THE INVENTION

The present invention relates to a digital signal receiver and a digital signal display method, and it is suitably applied to the reception of digital signals containing data information, video information and audio information which will be billed to a user.

There has heretofore been proposed such an apparatus that, when broadcast digital signals containing charge-based digital information are transmitted from a broadcast station to a signal receiver at a user side through a transmission path using a satellite or a transmission path using a cable, software information (for example, video soft, music soft, an electronic table of programs, shopping information, game soft, educational information or the like) to be transmitted is converted to a digital signal by using BML language (Broadcast Markup Language) and then transmitted to the signal receiver.

In this case, a BML browser for data broadcast which converts BML digital information to audiovisual signals is provided at the signal receiver side, and the BML browser enables a user to select desired software information and to watch/listen to it on a display device as occasion demands.

When software information is distributed to many users using a broadcast system as described above, it is desirable that a digital signal having a proper amount of information be transmitted to the user side and then the user is able to watch it at a time convenient to him or her.

SUMMARY OF THE INVENTION

The present invention has been implemented in view of the foregoing point, and has as an object to provide a digital signal receiver and display method in which software information is transmitted to the distributed information storage unit of a user utilizing a broadcast vacant time, for example, thereby enabling the amount of information to be stored to be further scaled down when a user selects the information which the user wants to watch at a time convenient to him or her.

In order to attain the above object, according to the present invention, there is provided a digital signal receiver including a reception processor operable to receive a broadcast signal containing information data and to cause the information data to be displayed on a display unit by using a browser; and a distributed information storage unit operable to obtain the information data from the reception processor, to store the information data in a data storage device, to read the information data stored in the data storage device, and to supply the read information data to the reception processor for display. The distributed information storage unit includes a period separating unit operable to separate from the information data one period of data having an amount of data corresponding to plural periods which are periodically contained in the broadcast signal, and a periodizing unit operable to process the one period of data into periodized information data having the plural periods.

Further, according to the presents invention, there is provided a digital signal display method which includes receiving a broadcast signal containing information data; separating from the information data one period of data having an amount of data corresponding to plural periods which are periodically contained in the broadcast signal; storing the one period of data in a data storage device; reading out the one period of data from the data storage device as occasion demands; processing the one period of data into periodized information data having plural periods; and displaying the periodized information data on a display unit using a browser.

According to the present invention, the information data received by the reception processor is displayed on the display unit in a live mode through the browser, and after the data is stored in the data storage device of the distributed information storage unit, the data is read out to be displayed on the display unit in a watch mode through the browser as occasion demands. Further, one period of data consisting of plural frames which are periodically and repetitively transmitted is separated from the data broadcast signal and is stored in the data storage device of the distributed information storage unit, whereby the scale of the data storage device can be further simplified.

BRIEF DESCRIPTION OF THE DRAWINGS

FIG. 3 is a schematic diagram showing a selection menu frame;

FIG. 4 is a schematic diagram showing a deletion menu frame; and

FIGS. 5A and 5B are diagrams showing an overlay frame created by using distributed information stored in a distributed information storage device.

DETAILED DESCRIPTION

A preferred embodiment according to the present invention will be described herein with reference to the accompanying drawings.

Figure 1:
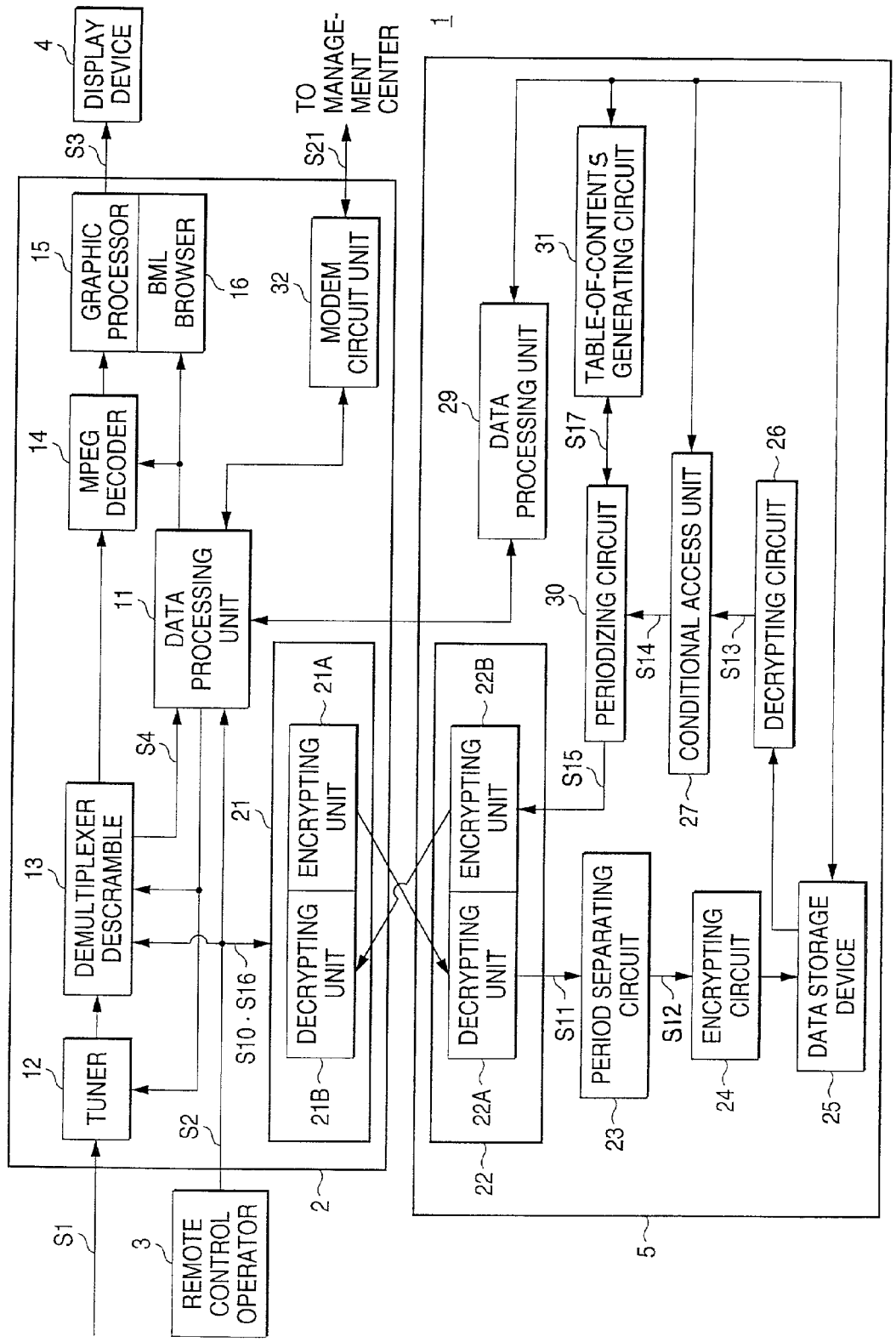
FIG. 1 is a systematic diagram showing a digital signal receiver according to the present invention.

In FIG. 1, reference numeral 1 represents a digital signal receiver as a whole. In the digital signal receiver 1, a broadcast reception signal S1 transmitted from a broadcast station is received by a reception processor 2 comprising a set top box. As occasion demands, the broadcast reception signal S1 thus received is supplied to a display device 4 comprising, for example, a television CRT (Cathode Ray Tube) by a user's selection and indication through a remote control operator 3 so that the user can watch/listen to the broadcast reception signal S1. In addition, software information distributed as broadcast data with the broadcast reception signal S1 can be accumulated in a distributed information storage device 5 comprising a hard disc.

The reception processor 2 receives the broadcast reception signal S1 of MPEG (Moving Picture Image Coding Experts Group) system through a tuner 12 under the control of a data processing unit 11 comprising a microcomputer which operates in response to an operating signal S2 from a remote control operator 3. The broadcast reception signal S1 is then subjected to demultiplexing processing and descrambling processing by a demultiplexer descramble circuit 13 to decrypt encrypted data. Thereafter, the data is decoded by an MPEG decoder 14 and the images thereof are displayed by a graphic processor 15 and a BML browser 16 for data broadcast, and the result is transmitted as an audiovisual signal S3 to the display device 4.

In the case of this embodiment, when charge-based broadcast information is broadcast, keys for decrypting encrypted data for broadcast and encrypted data for software are transmitted with predetermined packets of the broadcast reception signal S1. Therefore, when a user decrypts desired broadcast information with these keys to watch/listen to the broadcast information, processing may thereafter be carried out to bill the user for the broadcast information.

When broadcast data described in the BML language comes with the broadcast reception signal S1, the data processing unit 11 carries out display processing in which, by giving data information S4 to the BML browser 16, the content of the data information can be displayed on the display device 4 through the graphic processor 15.

Here, the BML language has contents indicating a moving picture display format, a still picture display format, a text display format and a graphic display format, and it enables the BML browser 16 to display the data broadcast of a moving picture, a still picture, text and a graphic display on the television receiver 4 through the graphic processor 15.

In the case of this embodiment, when a broadcast vacant time (for example, at a time after midnight) comes, the broadcast encrypted data of the broadcast reception signal S1 is decrypted (while the software encrypted data is kept unchanged) in the demultiplexer descramble circuit 13, and then the broadcast reception signal S1 is subjected to encryption processing as the distributed information S10 in an encrypting unit 21A of an encryption processing circuit 21 comprising an IEEE1394 interface. Thereafter, it is transmitted to a decrypting unit 22A of an encryption processing circuit 22 of the distributed information storage device 5, whereby the distributed information is collectively distributed to the distributed information storage device 5 during a broadcast vacant time in the night.

The encryption processing circuits 21 and 22 execute encryption and decryption processing so that distributed information is prevented from being freely watched/listened to by any person when the distributed information is received/delivered between the reception processor 2 and the distributed information storage device 5.

Distributed information S11 obtained from the encryption processing circuit 22 is subjected to period separation processing in a period separating circuit 23.

Figure 2:
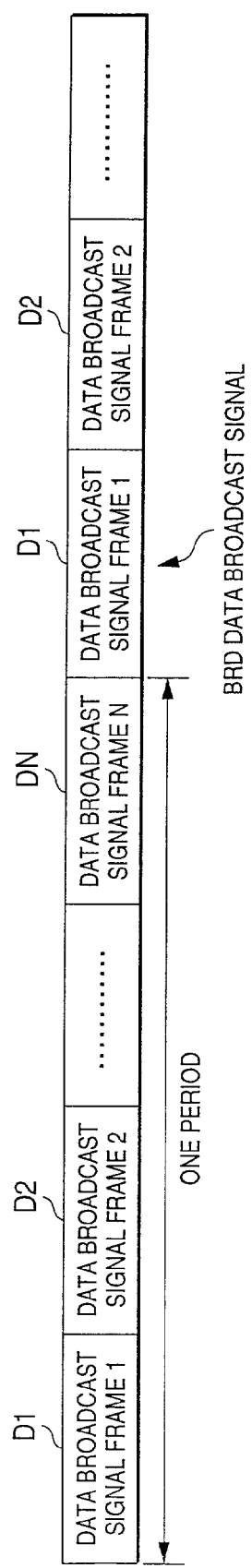
FIG. 2 is a schematic diagram showing a signal format of a data broadcast signal.

Here, the BML data broadcast signal BRD contained in the broadcast reception signal S1 transmitted from the broadcast station comes in such a way that data broadcast signals D1, D2, . . . , DN of plural frames 1, 2, . . . , N are set as a one-period signal and the one-period signal thus set is repetitively transmitted at a predetermined number of periods (that is, subjected to Carrousel processing) as shown in FIG. 2. Accordingly, when the user watches/listens to the distributed information concerned on the display device 4 in a live mode, the user can select and display it at all times without extra time delay (the user waits for at most only the time corresponding to one period) when the user wants to watch/listen to it. Only the data corresponding to one period is separated from the periodically repetitive BML data and then stored as storage data S12 through an encrypting circuit 24 into a data storage device 25 comprising a hard disc, for example.

As described above, with respect to the distributed information which is mainly transmitted during the night, the software information thus distributed is accumulated in the data storage device 25 as distributed data in which only the broadcast encrypted data is decrypted and the software encrypted data is left as it is.

Encryption processing is carried out in the encrypting circuit 24 to prevent the distributed data from being interpreted from the hard disc or other storage medium in the data storage device 25 without authorization.

The distributed data stored in the data storage device 25 is read out at a user's convenient time (for example, a broadcast time in the daytime), and supplied as read-out data S13 through the decrypting circuit 26 to a conditional access unit 27.

In the case of this embodiment, a command to watch the stored distributed data is given to the data processing unit 11 of the reception processor 2 on the basis of the operating signal S2 which is input by a user's operation of the remote control operator 3. At this time, the data processing unit 11 transmits the watch command to the data processing unit 29 of the distributed information storage device 5, whereby the data processing unit 29 causes all of the information items in the distributed data stored in the data storage device 25 to be read out.

At this time, the decrypting circuit 26 and the conditional access unit 27 carry out the process of decrypting the software encrypted data in the information items of each read-out data S13 from the data storage device 25 under the control of the data processing unit 29, leaving the audience record data of the information items thus decrypted (watching/listening time, fee charged, etc.).

The read-out data S14 decrypted in the conditional access unit 27 is sent to a periodizing circuit 30. In the periodizing circuit 30, the distributed data which has been separation processed into the one-period amount of data and stored is returned (restored) to repetitive data of plural periods which has the same signal format as the original data transmitted as the broadcast reception signal S1, and is transmitted as read-out information S15 through the encrypting unit 22B of the encryption processing circuit 22 to the decrypting unit 21B of the encryption processing circuit 21.

The read-out information S16 obtained in the decrypting unit 21B of the encryption processing circuit 21 is sent to the demultiplexer descramble circuit 13 as a signal having the same signal format as the broadcast reception signal S1, and thus it can be displayed on the display device 4 by the BML browser 16 (but it could not be displayed if it had only an amount of data corresponding to one period).

An information item name is affixed as management data to the distributed information stored in the distributed information storage device 5 for every information item. When the user operates the remote control operator 3 to input a display command of "server menu", the table-of-contents generating circuit 31, the data storage device 25 and the conditional access unit 27 are controlled through the data processing units 11 and 29 to generate table-of-contents information S17 having the same signal format as the distributed information S10 based on each information item name, and to transmit the table-of-contents information as read-out information S15 from the periodizing circuit 30.

In the case of this embodiment, when a user (one person or plural persons) using the digital signal receiver 1 inputs his/her favorite information corresponding to his/her fancy, for example, inputs information on priorities of contents to watch or listen to, the table-of-contents generating circuit 31 can generate a table-of-contents frame for each user.

The table-of-contents information S17 generated in the table-of-contents generating circuit 31 is supplied to the demultiplexer descramble circuit 13 through the periodizing circuit 30, the encrypting unit 22B of the encryption processing circuit 22 and the decrypting unit 21B of the encryption processing circuit 21.

The BML data information contained in the read-out information S16 supplied from the distributed information storage unit 5 to the demultiplexer descramble circuit 13 as described above is sent to the BML browser 16 through the data processing unit 11, thereby carrying out the process of generating a data information frame and a table-of-contents frame concerning the read-out information S15 in the graphic processor 15 and enabling them to be displayed on the display device 4.

The audience record data left in the conditional access unit 27 is periodically (for example, once per month) read out to the data processing unit 29, and transmitted as billing data S21 from the data processing unit 11 through a modem circuit 32 to a billing management center.

For distributed information which the user watched/listened to from the distributed information distributed to the data storage device 25, the billing management center bills the user in a deferred payment style.

In the above construction, when cost-free broadcast information is received as a broadcast reception signal S1, the reception processor 2 processes the reception signal S1 under the control of the data processing unit 11 based on the operation signal S2 from the remote control operator 3 through the tuner 12, the demultiplexer descramble circuit 13, the MPEG decoder 14, the graphic processor 15 and the BML browser 16 to obtain the audiovisual signal S3, whereby the user is allowed to watch/listen to the data on the display device 4.

On the other hand, when charged-based broadcast information is received as a broadcast reception signal S1 and the user wants to immediately watch/listen to this information on the display device 4 in the live mode, the encrypted data is decrypted in the demultiplexer descramble circuit 13 using a decrypting key transmitted together with the desired broadcast information to thereby enable the user to watch/listen to the broadcast information on the display device 4 through the MPEG decoder 14, the graphic processor 15 and the BML browser 16. At the same time, the data processing unit 11 transmits the audience record of the broadcast information through the modem circuit 32 to the management center for billing.

The BML browser 16 in the live mode displays a selection menu frame P11 as shown in FIG. 3 on the display device 4 on the basis of an item address contained in the broadcast reception signal S1, and displays a "watch" icon beside each information item for the user to select an information item which the user wants to watch.

On the other hand, when the broadcast station is set to a broadcast mode for broadcasting distributed information, the data processing unit 11 identifies this mode, and controls the demultiplexer descramble circuit 13 so that the distributed information S10, in which only the broadcast encrypted data is decrypted, is taken into the distributed information storage device 5 through the encryption processing circuits 21 and 22.

The periodizing separation circuit 23 of the distributed information storage device 5 picks up only the data broadcast signal of one period from the distributed information S11 obtained from the encryption processing circuit 22 and stores it in the data storage device 25 through the encrypting circuit 24.

The data broadcast signal BRD constituting the distributed information S11 is designed so that the data broadcast signals D1, D2, . . . , DN of frames 1, 2, . . . , N are set as a group and this group is periodically repetitively transmitted, as shown in FIG. 2, so that the reception processor 2 can surely receive the data broadcast signals of plural frames (the information of a desired frame can be received if a user waits for only one period at longest).

As a result, the information of all the frames broadcast from the broadcast station of a channel received by the tuner is stored in the data storage device 25, so that the user is allowed to afterwards watch the frames of his/her desired information content at a convenient time (at a time during the daytime, for example). In order to watch information stored in the data storage device 25, a user selects an item by the remote control operator 3.

The data processing unit 11 of the reception processor 2 transmits a watch command to the data processing unit 29 of the distributed information storage device 5, which reads out the information item data of the desired channel from the data storage device 25, and supplies the information item data through the decrypting circuit 26 and the conditional access unit 27 to the periodizing circuit 30.

At this time, the table-of-contents generating circuit 31 creates a selection menu frame P11 as shown in FIG. 3 in the BML language on the basis of the information item data supplied to the periodizing circuit 30, and returns it as table-of-contents information S17 to the periodizing circuit 30 to convert it to read-out information S15 having the same signal format as the broadcast reception signal S1 sent to the demultiplexer descramble circuit 13. The data thus converted is passed through the encryption processing circuits 22 and 21 and then supplied to the demultiplexer descramble circuit 13.

As described above, the demultiplexer descramble circuit 13 displays the selection menu frame P11 as audiovisual signal S3 on the display device 4 through the MPEG decoder 14, the graphic processor 15 and the BML browser 16.

Here, the selection menu frame P11 displays, in the form of a list, both the information item name (information item name 1, information item name 2, . . .) representing the content of the broadcast information stored in the data storage device 25 and a "watch" icon displayed in alignment with each information item name. Thus, by indicating through the remote control operator 3 the "watch" icon of the information item name which the user wants to watch, the user can select the broadcast information represented by the information item name.

At this time, the BML browser 16 transmits a watch request for the item address of the selected information item name from the data processing unit 11 of the reception processor 2 to the data processing unit 29 of the distributed information storage device 5, whereby the data storage device 25 is set to read out the information data for the selected information item name. The information data thus read out is transmitted to the periodizing circuit 30 after the software encrypted data thereof has been decrypted by a key transmitted together in the conditional access unit 27, whereby the information of the selected information item is set to be displayed on the display device 4 through the encryption processing circuits 22 and 21, the demultiplexer descramble circuit 13, the MPEG decoder 14, the graphic processor 15 and the BML browser 16. In addition, the conditional access unit 27 holds the decrypted information item name and the audiovisual data, such as a watching time, etc., in a watch record memory provided therein.

As described above, the user can watch his/her desired information data at a favorite watching time and at a desired frequency by selecting his favorite information item name while viewing the selection menu frame P11 displayed on the display device 4 when a channel is selected.

The watch record of the user is accumulated as watch record data in the conditional access unit 27. When an account processing instruction is forwarded from the billing management center through the modem circuit 32 of the reception processor 2 to the data processing unit 11 at a predetermined account time (for example, on a predetermined date once per month), the watch record data is transmitted as billing data S21 through the data processing units 29 and 11 and the modem circuit 32 to the management center.

A part of the information data stored in the data storage device 25 may be deleted through a "delete menu" operating instruction input through the remote control operator 3 by the user. In such case, a delete menu frame P12 as shown in FIG. 4 is created in the table-of-contents generating circuit 31 and displayed on the display device 4 through the periodizing circuit 30, the encryption processing circuits 22 and 21, the demultiplexer descramble circuit 13, the MPEG decoder 14, the graphic processor 15 and the BML browser 16. The user operates the remote control operator 3 to indicate and input in the delete menu frame P12 the "delete" icon corresponding to the information item name which the user wants to delete.

At this time, the BML browser 16 deletes the information data corresponding to the information item name from the data storage device 25 through the data processing units 11 and 29, and sends the undeleted and remaining information item name data from the data storage device 25 through the decrypting circuit 26, the conditional access unit 27 and the periodizing circuit 30 to the table-of-contents generating circuit 31 to create a new delete menu frame P12 in which the deleted information item name has been removed. The new delete menu frame P12 is then displayed on the display device 4. The distributed information data stored in the data storage device 25 can be watched or deleted by the user as occasion demands.

As described above, the information data stored in the data storage device 25 can be read out to the data processing unit 29 by using, for example, the broadcast vacant time (a time at night) as the user wants, and can be displayed on the display device 4 through the BML browser 16. Therefore, for example, where a user watches the moving pictures of "a baseball game broadcast" being broadcast as a current broadcast reception signal S1 as shown in FIG. 5A, the user can select an information item by using the remote control operator 3 to read out the "past record of a player" being displayed from the data storage device 25 and to forward it to the BML browser 16. An overlay frame is then displayed on the display device 4 such that the moving pictures of the baseball game broadcast which are being currently received are overlaid on the information data read out from the data storage device 25, as shown in FIG. 5B.

According to the above construction, when the distributed information is broadcast as the broadcast reception signal S1, in the periodizing separation circuit 23 of the distributed information storage device 5, only the data broadcast signal of one period is separated from the data broadcast signals which are repetitively broadcast with the plural data broadcast signal frames 1, 2, . . . , N as one group and stored in the data storage device 25. When the distributed information is watched, the data broadcast signal of one period read out from the data storage device 25 is periodized in the periodizing circuit 30 in the same signal format as the original broadcast reception signal. As a result, the amount of information stored in the data storage device 25 can be further scaled down.

The menu frame representing the content of the information data stored in the data storage device 25 is created in the table-of-contents generating circuit 31 of the distributed information storage device 5, and the menu frame is converted to the same signal format as the broadcast reception signal S1 received and supplied to the graphic processor 15 and the BML browser 16. As a result, the menu frame can be displayed using browser 16. The information content of the broadcast reception signal S1 therefore can be displayed without providing any special-purpose browser for displaying the menu frame, thereby further simplifying the construction of the digital broadcast receiver 1 as a whole.

The information item stored in the data storage device 25 becomes an information item inherent to each user as the new accumulation or deletion is repeated. Therefore, it cannot be displayed by using a general BML browser, and a special-purpose BML browser is required to be provided to the distributed information storage device 5. However, according to the construction of the above embodiment, the above requirement is unnecessary to be satisfied.

In the above-described embodiment, the key for decrypting the encrypted information data is broadcast together with the encrypted information data in the broadcast reception signal S1. However, the present invention may be likewise applied to a broadcast system in which, when an information item which a user desires to watch is selected from the menu frame, the key for decrypting the encrypted data of the desired information item is transmitted from the management center through the modem circuit 32.

In the above-described embodiment, the information data is generated by using the BML language. However, the present invention is not limited to this embodiment, and the same effect as described above can be achieved where the information data is generated by using XML (Extensible Markup Language).

The invention claimed is:

1. A digital signal receiver, comprising:
a reception processor operable to receive a broadcast signal and information data contained in said broadcast signal, said information data being repetitively transmitted during each of a plurality of first time periods of said broadcast signal, said reception processor including a browser operable to cause said received information data to be output in a user-perceptible manner; and
a distributed information storage unit operable to obtain said received information data from said reception processor, said distributed information storage unit including a period separating unit and a periodizing unit, said period separating unit being operable to separate an amount of information data from said obtained information data, said separated amount of information data corresponding to an amount of said information data transmitted during a single, whole one of said first time periods, said distributed information storage unit being further operable to store said separated amount of information data in a data storage device, and to read said stored information data from said data storage device,
said periodizing unit being operable to process said read information data into a periodic signal having a plurality of second time periods, said read information data being periodically contained in each of said second time periods, said distributed information storage unit being further operable to provide said periodic signal to said reception processor for output of said information data contained in said periodic signal using said browser.

2. The digital signal receiver as claimed in claim 1, wherein said distributed information storage unit includes said data storage device.

3. The digital signal receiver as claimed in claim 1, wherein said distributed information storage unit further includes a table-of-contents generating unit operable to generate a menu frame representing plural information items contained in said read information data.

4. The digital signal receiver as claimed in claim 3, wherein said table-of-contents generating unit is operable to generate said menu frame for each user by inputting preference information for each said user.

5. The digital signal receiver as claimed in claim 3, wherein said table-of-contents generating unit is operable to generate said menu frame using information on priorities of contents which a user desires to be output in said user-perceptible manner.

6. The digital signal receiver as claimed in claim 1, wherein said reception processor includes an encryption unit operable to form encrypted information data by encrypting said received information data before said received information data is obtained by said distributed information storage unit, and said distributed information storage unit further includes a decryption unit operable to decrypt said encrypted information data obtained from said reception processor.

7. The digital signal receiver as claimed in claim 1, wherein said distributed information storage unit further includes an encryption unit operable to form an encrypted periodic signal by encrypting said periodic signal before said periodic signal is supplied to said reception processor, and said reception processor includes a decryption unit operable to decrypt said encrypted periodic signal supplied from said distributed information storage unit.

8. A digital signal receiver as claimed in claim 1, wherein said information data contained in said broadcast signal is described in a markup language and said browser corresponds to said markup language, such that said browser is operable to cause said received information data to be output in accordance with said markup language.

9. A digital signal display method, comprising:
receiving a broadcast signal and information data contained in said broadcast signal, said information data being repetitively transmitted during each of a plurality of first time periods of said broadcast signal;

separating an amount of information data from said received information data, said separated amount of information data corresponding to an amount of said information data transmitted during a single, whole one of said first time periods;

storing said separated amount of information data in a data storage device;

reading out said stored information data from said data storage device;

processing said read information data into a periodic signal having a plurality of second time periods, said read information data being periodically contained in each of said second time periods; and displaying said information data contained in said periodic signal on a display unit using a browser.

10. The digital signal display method as claimed in claim 9, further comprising encrypting said received information data to form encrypted information data and decrypting said encrypted information data to form decrypted information data after said step of receiving said broadcast signal and before said step of separating said amount of information data from said received information data.

11. The digital signal display method as claimed in claim 9, further comprising encrypting said periodic signal to form an encrypted periodic signal and decrypting said encrypted periodic signal to form a decrypted periodic signal, wherein said step of displaying includes displaying said decrypted periodic signal.

12. A digital signal display method as claimed in claim 9, wherein said information data contained in said broadcast signal is described in a markup language, said browser corresponds to said markup language, and said information data contained in said periodic signal is displayed in accordance with said markup language.

* * * * *